(12) United States Patent
Kobayashi

(10) Patent No.: US 8,449,224 B2
(45) Date of Patent: May 28, 2013

(54) CUTTING TOOL AND CUTTING METHOD

(75) Inventor: Youji Kobayashi, Satsumasendai (JP)

(73) Assignee: Kyocera Corporation, Kyoto (JP)

( * ) Notice: Subject to any disclaimer, the term of this patent is extended or adjusted under 35 U.S.C. 154(b) by 529 days.

(21) Appl. No.: 12/675,383

(22) PCT Filed: Aug. 29, 2008

(86) PCT No.: PCT/JP2008/065572
§ 371 (c)(1),
(2), (4) Date: Jun. 10, 2010

(87) PCT Pub. No.: WO2009/028679
PCT Pub. Date: Mar. 5, 2009

(65) Prior Publication Data
US 2010/0296882 A1 Nov. 25, 2010

(30) Foreign Application Priority Data

Aug. 30, 2007 (JP) ................................ 2007-223656

(51) Int. Cl.
*B23B 27/16* (2006.01)
(52) U.S. Cl.
CPC ...................................... *B23B 27/16* (2013.01)
USPC .......................................... 407/102; 407/103
(58) Field of Classification Search
USPC ................. 407/102, 103, 104, 106, 107, 111, 407/112
IPC ....................................................... B23B 27/16
See application file for complete search history.

(56) References Cited

U.S. PATENT DOCUMENTS 3,889,330 A * 6/1975 Zweekly ........................ 407/103
4,621,955 A 11/1986 Briese
(Continued)

FOREIGN PATENT DOCUMENTS

| DE | 69017272 T3 | 6/1998 |
| JP | 09-108905 | 4/1997 |
| JP | 2002-187006 | 7/2002 |

OTHER PUBLICATIONS

Sherline Products, Miniature Machine Tools Assembly and Instruction Guide, 2003, Fifth Edition, p. 23.*

(Continued)

*Primary Examiner* — Daniel Howell
*Assistant Examiner* — Alan Snyder
(74) *Attorney, Agent, or Firm* — DLA Piper LLP (US)

(57) ABSTRACT

A cutting tool of the invention is equipped with a cutting insert comprising an upper surface, a lower surface, a side surface connected to the upper surface and the lower surface, and an upper surface side cutting edge and a lower surface side cutting edge formed at an intersection portion between the upper surface and the side surface and at an intersection portion between the lower surface and the side surface, respectively; and a holder comprising at a front part thereof an insert pocket to which the cutting insert is attached. The insert pocket comprises a bearing seat surface against which the lower surface of the cutting insert abuts, and is opened into a front surface and a side surface of the holder, respectively. At least one of a first intersection portion lying at an intersection portion between the bearing seat surface of the insert pocket and the front surface of the holder, and a second intersection portion lying at an intersection portion between the bearing seat surface of the insert pocket and the side surface of the holder, lies more outward than the lower surface side cutting edge of the cutting insert. A cutting method using the cutting tool is also provided.

12 Claims, 8 Drawing Sheets

U.S. PATENT DOCUMENTS 4,682,916 A    7/1987  Briese
5,004,378 A *  4/1991  Arai et al. .................... 407/106
5,100,268 A    3/1992  Nakayama et al.
5,324,144 A *  6/1994  Katbi et al. ................... 407/114
5,549,425 A    8/1996  Bernadic et al.
5,836,724 A * 11/1998  Satran et al. ................. 407/104

OTHER PUBLICATIONS

German language office action dated Nov. 6, 2012 and its English language translation issued in corresponding German application 112008002324.7.

* cited by examiner (a)

(b)

(c)

(a)

(b)

CUTTING TOOL AND CUTTING METHOD

CROSS-REFERENCE TO THE RELATED APPLICATIONS

This application is a national stage of international application No. PCT/JP2008/065572, filed on Aug. 29, 2008, and claims the benefit of priority under 35 USC 119 to Japanese Patent Application No. 2007-223656, filed on Aug. 30, 2007, the entire contents of which are incorporated herein by reference.

TECHNICAL FIELD

The present invention relates to a cutting tool with a cutting insert, whose upper and lower surfaces are usable, attached to an insert pocket of a holder, and to a cutting method using the cutting tool.

BACKGROUND ART

In general, as a cutting tool for cutting a work material such as a metal material, there are those in which a cutting insert whose upper and lower surfaces are usable, namely, a double-sided cutting insert is attached to an insert pocket of a holder.

This cutting tool comprises the cutting insert and the holder. The cutting insert is the double-sided cutting insert (the negative type) in which an upper surface side cutting edge and a lower surface side cutting edge are disposed at the intersection portion between the upper surface and a side surface, and at the intersection portion between the lower surface and the side surface. This cutting insert is economical because when the upper surface side cutting edge in use is worn, the cutting insert is turned back to use the lower surface side cutting edge not yet used.

On the other hand, an insert pocket to which the cutting insert is attached is formed at a front part of the holder. The insert pocket comprises a bearing seat surface against which the lower surface of the insert abuts, and two bearing side surfaces against which the side surfaces of the insert abut. The insert pocket is opened into a front surface and a side surface of the holder, respectively.

However, the bearing seat surface of the insert pocket is made smaller than the lower surface of the cutting insert, as disclosed in Japanese Unexamined Utility Model Application Publication No. 1-175104. Therefore, when the cutting insert is attached to the insert pocket, the lower surface side cutting edge of the cutting insert is protruded from the front surface and the side surface of the holder.

In this state, if a work material is cut under conditions, for example, where chips having a large curl diameter are generated, there is the problem that the chips curled up to the lower surface of the cutting insert are contacted with the lower surface side cutting edge, and the lower surface side cutting edge is fractured.

This problem is noticeable when in the upper surface and the lower surface of the cutting insert, a breaker groove is formed more inside of the cutting insert than the upper surface side cutting edge and the lower surface side cutting edge, or when the upper surface side cutting edge and the lower surface side cutting edge have a sharp edge, or when the cutting insert has a small thickness. This problem also occurs when the bearing seat surface of the insert pocket is formed in substantially the same size as the lower surface of the cutting insert.

DISCLOSURE OF THE INVENTION

An advantage of the present invention is to provide a cutting tool capable of reducing fractures in an unused lower surface side cutting edge in a double-sided cutting insert during cutting, and provide a cutting method.

A cutting tool according to an embodiment of the invention is equipped with a cutting insert comprising an upper surface, a lower surface, a side surface connected to the upper surface and the lower surface, and an upper surface side cutting edge and a lower surface side cutting edge formed at an intersection portion between the upper surface and the side surface and at an intersection portion between the lower surface and the side surface, respectively; and a holder comprising at a front part thereof an insert pocket to which the cutting insert is attached. The insert pocket comprises a bearing seat surface against which the lower surface of the cutting insert abuts, and is opened into a front surface and the side surface of the holder, respectively. At least one of a first intersection portion lying at an intersection portion between the bearing seat surface of the insert pocket and the front surface of the holder, and a second intersection portion lying at an intersection portion between the bearing seat surface of the insert pocket and the side surface of the holder, lies more outward than the lower surface side cutting edge of the cutting insert.

A cutting tool according to other embodiment of the invention is equipped with a cutting insert comprising an upper surface, a lower surface, a first side surface and a second side surface connected to the upper surface and the lower surface and adjacent to each other, a corner portion formed between the first and the second side surfaces, and an upper surface side cutting edge and a lower surface side cutting edge formed at positions corresponding to the corner portion in an intersection portion between the upper surface and the first and the second side surfaces, and in an intersection portion between the lower surface and the first and the second side surfaces, respectively; and a holder comprising at a front part thereof an insert pocket to which the cutting insert is attached. The insert pocket comprises a bearing seat surface against which the lower surface of the cutting insert abuts, and is opened into a front surface and a side surface of the holder, respectively. At least one of a first intersection portion lying at an intersection portion between the bearing seat surface of the insert pocket and the front surface of the holder, and a second intersection portion lying at an intersection portion between the bearing seat surface of the insert pocket and the side surface of the holder, lies more outward than the lower surface side cutting edge of the cutting insert.

A cutting tool according to another embodiment of the invention is equipped with a cutting insert comprising an upper surface, a lower surface, a side surface connected to the upper surface and the lower surface, and an upper surface side cutting edge and a lower surface side cutting edge formed at an intersection portion between the upper surface and the side surface and at an intersection portion between the lower surface and the side surface, respectively; a holder comprising at a front part thereof an insert pocket to which the cutting insert is attached; and a sheet member disposed between the cutting insert and the insert pocket. The insert pocket comprises a bearing seat surface against which the lower surface of the cutting insert abuts, and is opened into a front surface and a side surface of the holder, respectively. At least one of peripheral parts of the sheet member lying adjacent to the front surface and the side surface of the holder, respectively, lies more outward than the lower surface side cutting edge of the cutting insert.

A cutting method according to an embodiment of the invention is a method of cutting a work material using the above cutting tool and comprises the following steps (i) to (iii): (i) the approach step of relatively bringing the cutting tool near the work material; (ii) the cutting step of cutting a surface of the work material by rotating the work material and bringing the upper surface side cutting edge into contact with the surface of the work material; and (iii) the separation step of relatively separating the work material and the cutting tool.

In accordance with the cutting tools and the cutting method, even if the cutting insert has a small thickness, or cutting is carried out under conditions where chips having a large curl diameter are generated, these chips are less likely to contact an unused lower surface side cutting edge in the cutting insert. This produces the effect on fracture reduction in the unused lower surface cutting edge.

It should be noted that FIG. 2 and FIGS. 6(a) to 8(c) are the partially schematic plan views as viewed from a direction substantially perpendicular to the bearing seat surface of the holder.

PREFERRED EMBODIMENTS FOR CARRYING OUT THE INVENTION

Figure 1:
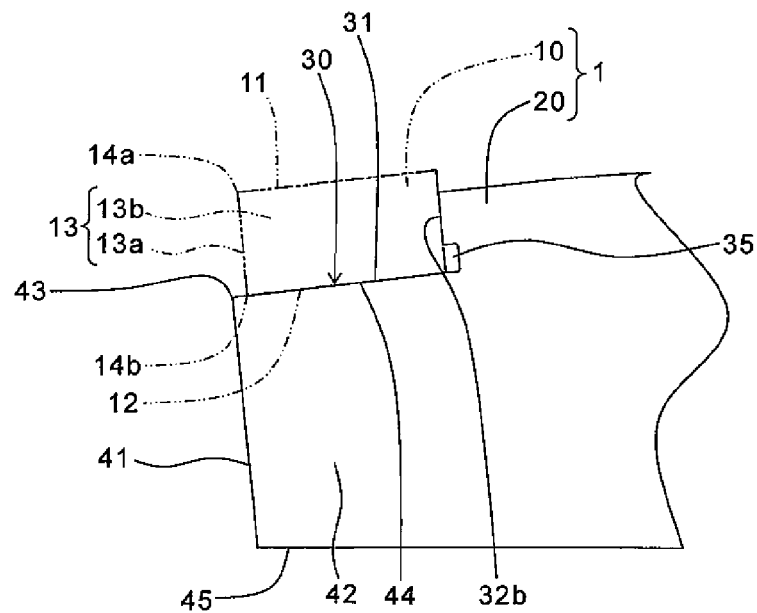
FIG. 1 is a partially schematic side view showing the vicinity of a front part of a holder of a cutting tool according to an embodiment of the invention.
Figure 2:
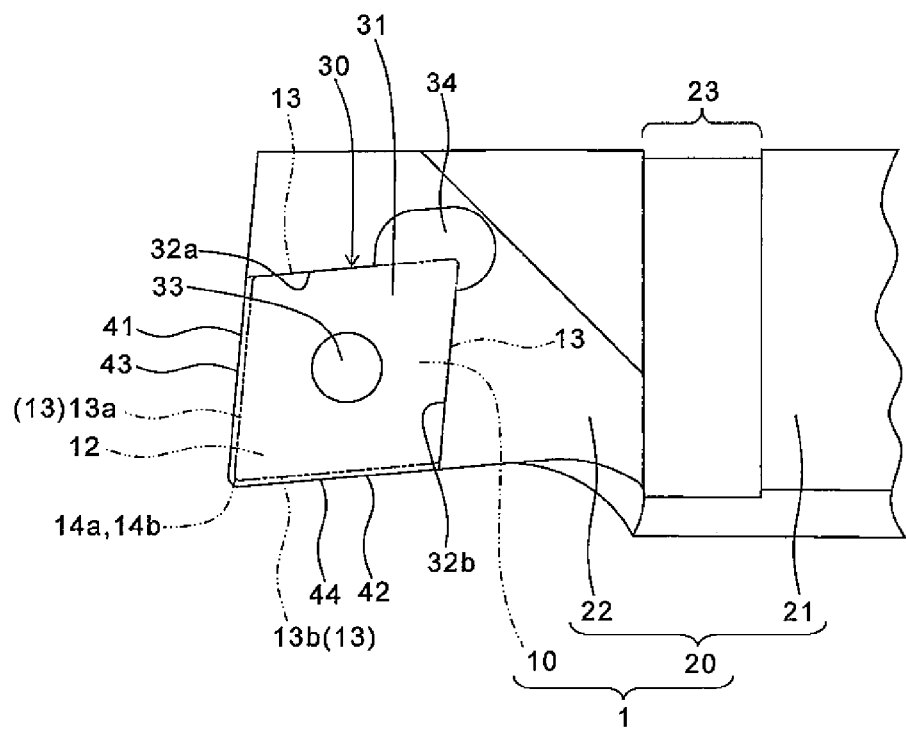
FIG. 2 is a partially schematic plan view showing the vicinity of the front part of the holder of the cutting tool according to the embodiment of the invention.

An embodiment of the cutting tool of the present invention is described in detail with reference to FIGS. 1 and 2. As shown in FIGS. 1 and 2, the cutting tool 1 of the present embodiment comprises a double-sided cutting insert (hereinafter referred to simply as an "insert") 10, and a holder 20. The insert 10 has a substantially parallelogram when viewed from above, and comprises an upper surface 11, a lower surface 12, and four side surfaces 13, 13, . . . .

In the case of an embodiment where components such as a land, a rake face, a breaker groove and a breaker projection are formed on the upper surface 11 side of the insert 10, the term "the upper surface 11" indicates the concept including these components. The same is true for the lower surface 12.

An upper surface side cutting edge 14a and a lower surface side cutting edge 14b are provided at positions, each corresponding to a corner portion when viewed from above, in the intersection portion between the upper surface 11 and the side surface 13 and the intersection between the lower surface 12 and the side surface 13. That is, the corner portion is formed between the first side surface 13a and the second side surface 13b among these four side surfaces 13, 13, . . . , which are connected to the upper surface 11 and the lower surface 12 and adjacent to each other. The upper surface side cutting edge 14a is formed at the position corresponding to the above corner portion in the intersection portion between the upper surface 11 and the first side surface 13a and in the intersection portion between the upper surface 11 and the second side surface 13b. The lower surface side cutting edge 14b is formed at the position corresponding to the above corner portion in the intersection portion between the lower surface 12 and the first side surface 13a and in the intersection portion between the lower surface 12 and the second side surface 13b.

Figure 3:
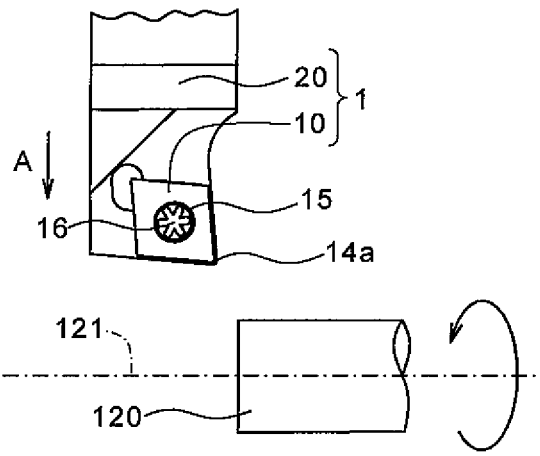
FIGS. 3(a) to 3(c) are process charts showing a cutting method according to an embodiment of the invention.
Figure 3:
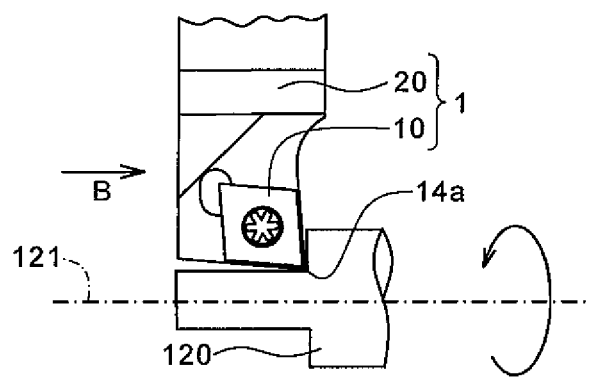
Figure 3:
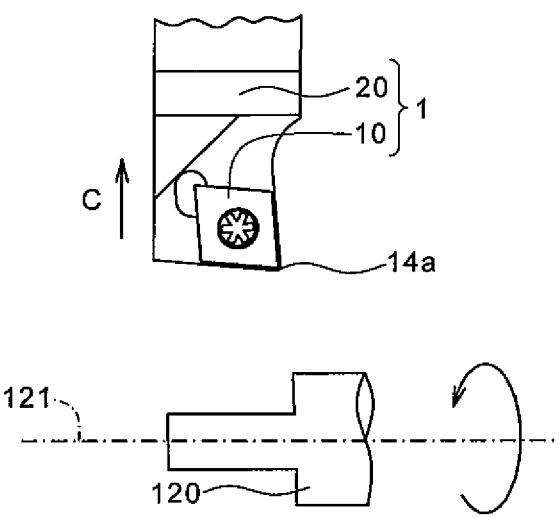

In the upper surface 11 and the lower surface 12, breaker grooves (not shown) are formed more inside of the insert 10 than the upper surface side cutting edge 14a and the lower surface side cutting edge 14b, respectively. The term "inside of the insert 10" means a through-hole 15 side in a substantially middle part of the insert 10 shown in FIGS. 3(a) to 3(c) described later.

The thickness of the insert 10 is preferably 2 to 5 mm. When the insert comprising the breaker groove is formed in such a small thickness, the unused lower surface side cutting edge is susceptible to fracture. In accordance with the present embodiment, as described later, chips are less likely to contact the unused lower surface side cutting edge 14b in the insert 10, thereby reducing fractures of the lower surface side cutting edge 14b.

On the other hand, the holder 20 comprises a support part 21 attached to an external equipment, and a front part 22. A concave 23 is formed at an upper portion of the support part 21 adjacent to the front part 22. The concave 23 is provided for preventing interference between the holder 20 and the external equipment when positioning is accomplished by causing the external equipment such as a tool block to abut against the side surface of the front part 22 of the holder 20.

An insert pocket 30 to which the insert 10 is attached by screwing is formed at the front end of the front part 22. The insert pocket 30 comprises a bearing seat surface 31 against which the lower surface 12 of the insert 10 abuts, and two bearing side surfaces 32a and 32b against which the side surfaces 13 of the insert 10 abut. A screw hole 33 for engaging a fixing screw 16 (refer to FIGS. 3(a) to 3(c)) to fix the insert 10 is formed at a substantially middle part of the bearing seat surface 31.

A hollow 34 is formed at the intersection portion between the bearing side surface 32a and the bearing side surface 32b. hollows 35 are formed at the intersection portion between the bearing side surface 32a and the bearing seat surface 31, and at the intersection portion between the bearing side surface 32b and the bearing seat surface 31, respectively (that adjacent to the bearing side surface 32a is not shown). These hollows 34 and 35 are provided for reducing situations where the insert 10 contacts and interferes with the bearing side surfaces 32a and 32b during attachment of the insert 10. That is, they function as a so-called insert clearance portion.

The insert pocket 30 is opened into a front surface 41 and a side surface 42 of the holder 20, respectively. The holder 20 comprises a first intersection portion 43 lying at the intersection portion between the bearing seat surface 31 of the insert pocket 30 and the front surface 41 of the holder 20, and a second intersection portion 44 lying at the intersection portion between the bearing seat surface 31 and the side surface 42.

Both of the first intersection portion 43 and the second intersection portion 44 lie more outward than the lower surface side cutting edge 14b of the insert 10. More specifically, as shown in FIG. 2, when viewed from a direction substantially perpendicular to the bearing seat surface 31, both of the first intersection portion 43 and the second intersection portion 44 lie more outward than the peripheral part of the lower surface 12 lying adjacent to the first side surface 13a and the second side surface 13b of the insert 10. Consequently, even if the insert 10 has a small thickness, or cutting is carried out under conditions where chips having a large curl diameter are generated, these chips are less likely to contact the lower surface side cutting edge 14b of the insert 10 owing to the first intersection portion 43 and the second intersection portion 44 lying more outward than the lower side cutting edge 14b with a predetermined distance therebetween. It is therefore capable of reducing fractures of the lower side cutting edge 14b.

It is important that the insert 10 should have the above construction in its condition prior to cutting. The term "its condition prior to cutting" means the condition where neither the upper surface side cutting edge 14a nor the lower surface side cutting edge 14b is used in the insert 10.

If the lower surface side cutting edge 14b is worn or fractured after the cutting, for example, the lower surface side cutting edge 14b can be defined in the following manner. That is, auxiliary line is drawn between the points of the portion subjected to neither wear nor fracture at the portions subjected to wear or fracture in the lower surface side cutting edge 14b, respectively. Then, the area between these additional lines and the portions subjected to neither wear nor fracture is defined as the lower surface side cutting edge 14b prior to the cutting.

The first intersection portion 43 and the second intersection portion 44 may lie more outward than the lower surface side cutting edge 14b by keeping therebetween a distance such that these chips are less likely to contact the lower surface side cutting edge 14b. As an illustrative example, the first intersection portion 43 and the second intersection portion 44 preferably lie more outward than the lower surface side cutting edge 14 with approximately 0.03 to 1 mm therebetween. However, the present invention is not limited thereto.

The bearing seat surface 31 of the insert pocket 30 is inclined so as to approach the lower surface 45 of the holder 20 (refer to FIG. 1) toward the front surface 41 of the holder 20. Thus, the insert 10 can be attached to the insert pocket 30 in such an inclined position as to approach the lower surface 45 of the holder 20 toward the front surface 41 of the holder 20. This ensures a clearance between the front part 22 and a work material. That is, by attaching the insert 10 in the inclined position, the clearance angle is increased, and hence the first intersection portion 43, the second intersection portion 44, and the front surface 41 and the side surface 42 of the holder 20, each of which lies more outward than the lower surface side cutting edge 14b with the predetermined distance therebetween, are less likely to contact the work material. Therefore, even a work material having a large diameter can also be satisfactorily machined.

The angle of inclination of the bearing seat surface 31 may be arbitrarily selected depending on cutting conditions or the like. Although the angle is not particularly limited, the angle between the bearing seat surface 31 and the lower surface 45 of the holder 20 is usually preferably approximately 1 to 20 degrees.

Next, a method of cutting a work material by using the above cutting tool 1 is described with reference to FIGS. 3(a) to 3(c).

Firstly, the insert 10 is attached to the holder 20. Specifically, the fixing screw 16 is inserted into the through-hole 15 formed at substantially the middle part of the insert 10. Subsequently, the tip end of the fixing screw 16 is engaged with the screw hole 33 formed in the bearing seat surface 31 of the insert pocket 30. Then, the insert 10 is attached to the holder 20 by directing the upper surface side cutting edge 14a of the insert 10 toward one side (refer to FIGS. 1 and 2).

After attaching the insert 10 to the holder 20, as shown in FIG. 3(a), a work material 120 is rotated around an axis 121 of the work material 120, and the upper surface side cutting edge 14a of the cutting tool 1 is brought near the work material 120 (in the direction indicated by arrow A in FIG. 3(a)). The upper surface side cutting edge 14a and the work material 120 may be relatively close to each other. For example, the work material 120 may be brought near the cutting tool 1.

As shown in FIG. 3(b), the work material 120 is cut by bringing the upper surface side cutting edge 14a into contact with the work material 120 while removing the cutting tool 1 in the direction indicated by arrow B. At this time, in the cutting tool 1, the first intersection portion 43 and the second intersection portion 44 lie more outward than the lower surface side cutting edge 14b of the insert 10. Consequently, even if the insert 10 has a small thickness, or cutting is carried out under conditions where chips having a large curl diameter are generated, these chips are less likely to contact the lower surface side cutting edge 14b of the insert 10, owing to the first intersection portion 43 and the second intersection portion 44 lying more outward than the lower side cutting edge 14b with a predetermined distance therebetween. It is therefore capable of reducing fractures of the lower side cutting edge 14b.

As the conditions where the chips having the large curl diameter are generated, there are, for example, the case of cutting a work material having a large diameter, and the case of cutting a work material having high toughness.

Thereafter, as shown in FIG. 3(c), the cutting tool 1 is separated from the work material 120 in the direction indicated by arrow C. Alternatively, the work material 120 and the cutting tool 1 may be relatively away from each other. For example, the work material 120 may be moved away from the cutting tool 1. When the cutting is continued, the step of bringing the upper surface side cutting edge 14a of the cutting tool 1 into contact with different points of the work material 120 may be repeated, keeping the work material 120 rotating. When the upper surface side cutting edge 14a in use is worn, an unused lower surface side cutting edge 14b may be used by turning back the insert 10.

Other embodiment of the invention is described in detail with reference to FIG. 4. Similar reference numerals have been used in FIG. 4 to denote the same parts as the forgoing FIGS. 1 to 3(c), and the descriptions thereof are omitted.

Figure 4:
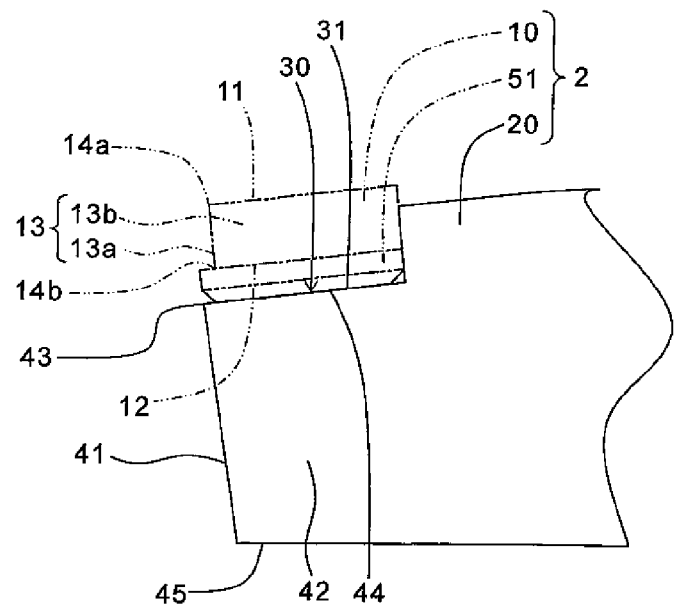
FIG. 4 is a partially schematic side view showing the vicinity of a front part of a holder of a cutting tool according to other embodiment of the invention.

As shown in FIG. 4, a cutting tool 2 of the present embodiment further comprises a sheet member 51 disposed between the insert 10 and the insert pocket 30. The first intersection portion 43 and the second intersection portion 44 of the holder 20, as well as the peripheral parts of the sheet member 51, lie more outward than the lower surface side cutting edge 14b of the insert 10.

With this construction, owing to the sheet member 51 lying more outward than the lower surface side cutting edge 14b with a predetermined distance therebetween, chips are less likely to contact an unused lower surface side cutting edge 14b in the insert 10. It is therefore capable of reducing fractures of the lower side cutting edge 14b. Additionally, the sheet member 51 is not protruded from the front surface 41 and a side surface 42 of the holder 20, thereby reducing the fracture of the sheet member 51 itself.

The sheet member 51 preferably comprises a hard material such as cemented carbide or hardened steel. In the present embodiment, the sheet member 51 is disposed, and hence the hollow 35 in the foregoing embodiment is not formed at the intersection portion between the bearing side surface and the bearing seat surface 31. Other constructions are similar to that described in the cutting tool 1 of the foregoing embodiment.

Still other embodiment of the invention is described in detail with reference to FIG. 5. Similar reference numerals have been used in FIG. 5 to denote the same parts as the forgoing FIGS. 1 to 4, and the descriptions thereof are omitted.

Figure 5:
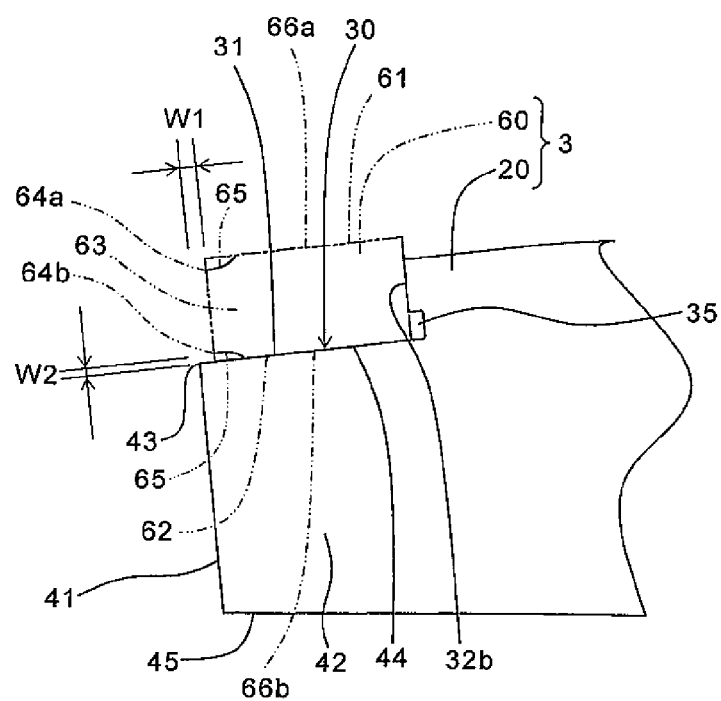
FIG. 5 is a partially schematic side view showing the vicinity of a front part of a holder of a cutting tool according to another embodiment of the invention.
Figure 6:
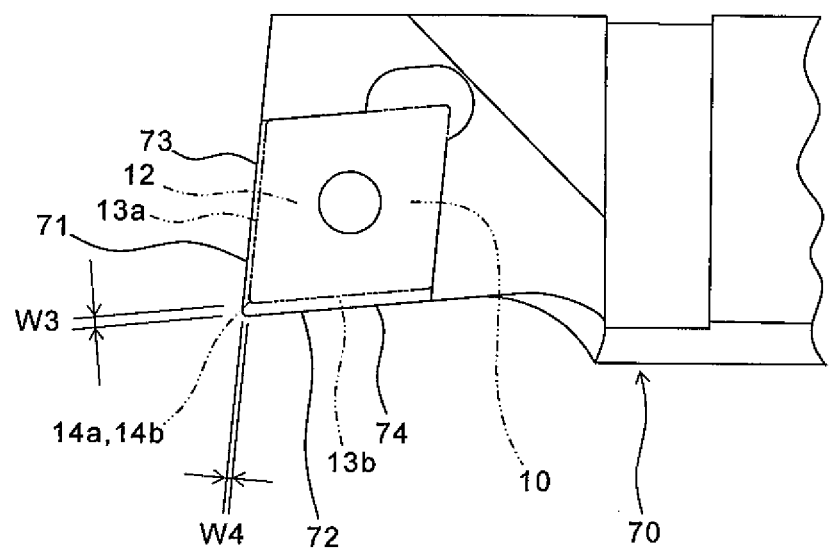
FIGS. 6(a) and 6(b) are partially schematic plan views, each showing the vicinity of a front part of a holder of a cutting tool according to still another different embodiment of the invention.
Figure 6:
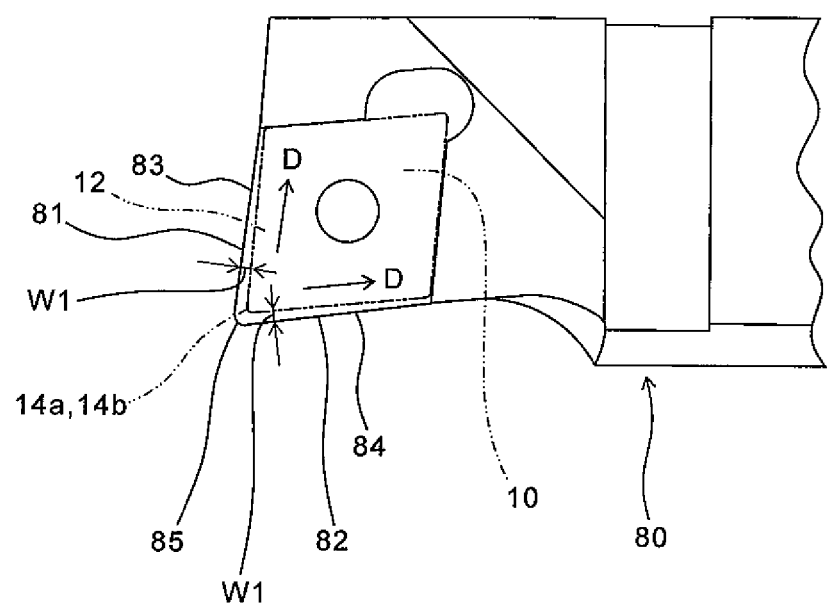
Figure 7:
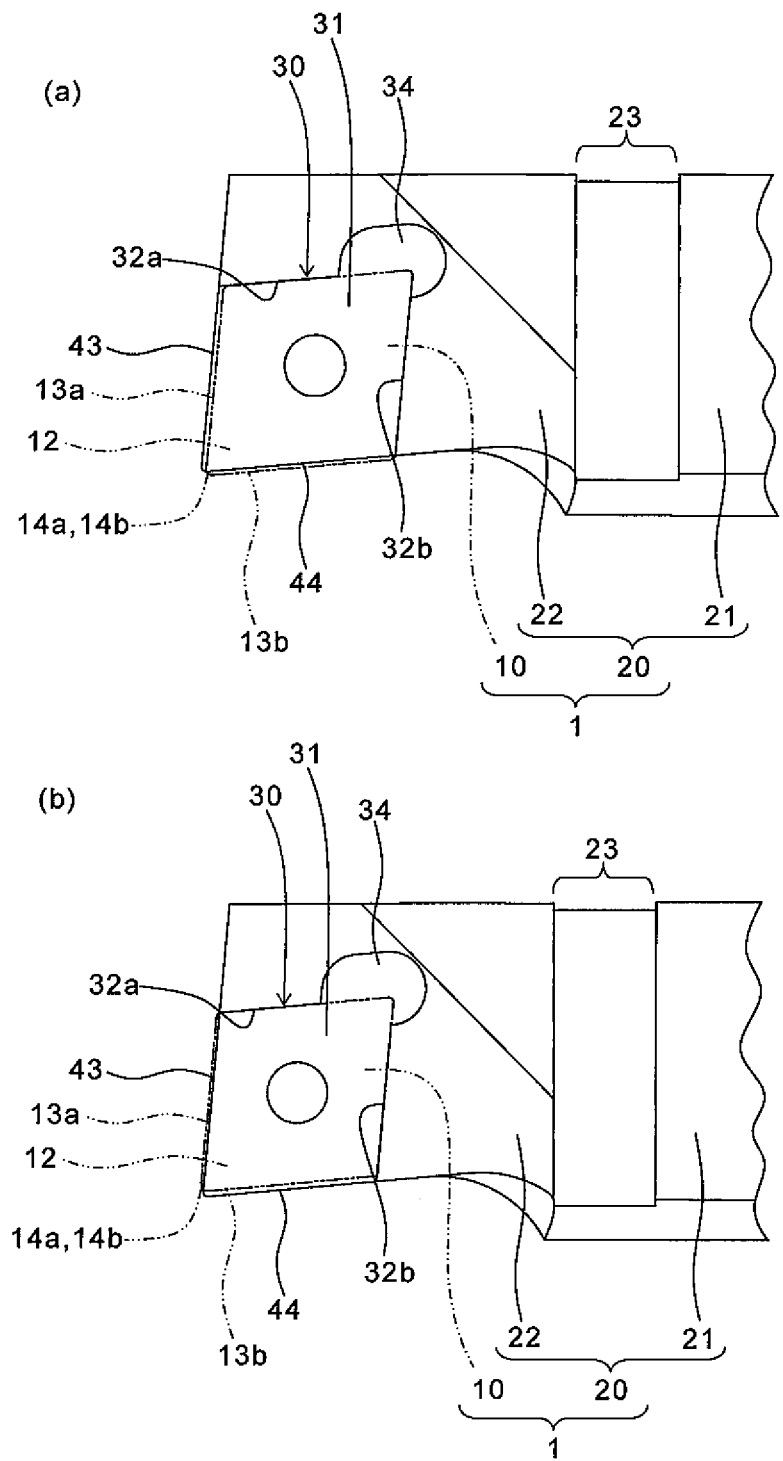
FIGS. 7(a) and 7(b) are partially schematic plan views, each showing the vicinity of a front part of a holder of a cutting tool according to a further different embodiment of the invention.
Figure 8:
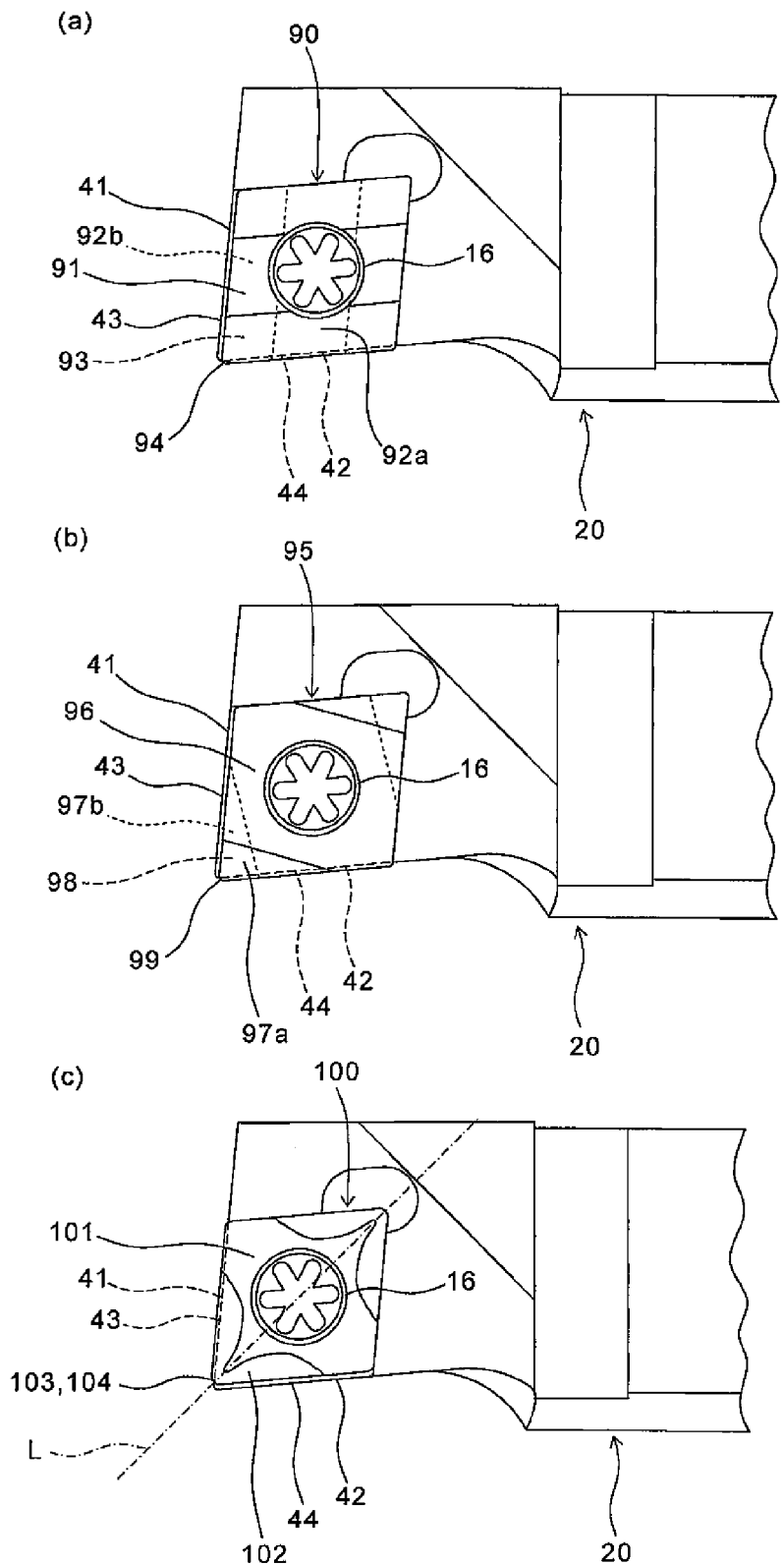
FIGS. 8(a) to 8(c) are partially schematic plan views, each showing the vicinity of a front part of a holder of a cutting tool according to a still further different embodiment of the invention.

As shown in FIG. 5, a cutting tool 3 of the present embodiment comprises an insert 60. The insert 60 comprises an upper surface side cutting edge 64a and a lower surface side cutting edge 64b at positions corresponding to a corner portion when viewed from above, in the intersection portion between an upper surface 61 and a side surface 63, and the intersection portion between a lower surface 62 and a side surface 63, respectively.

In the upper surface 61 and the lower surface 62, breaker grooves 65 and 65 are respectively formed more inside of the insert 60 than the upper surface side cutting edge 64a and the lower surface side cutting edge 64b. In the state in which the insert 60 is attached to the holder 20, the upper surface side cutting edge 64a is located at a lower position than a middle part 66a of the upper surface 61 of the insert 60, and the lower surface side cutting edge 64b is located at a higher position than a middle part 66b of the lower surface 62. Through-hole (not shown) through which the fixing screw 16 for fixing the insert 60 is inserted (refer to FIG. 3) is opened from the middle part 66a into the middle part 66b.

When the distance between the first intersection portion 43 out of the first intersection portion 43 and the second intersection portion 44 of the holder 20 and the peripheral part of the lower surface 62 of the insert 60 lying adjacent to the first intersection portion 43 is denoted by W1, and the distance between the bearing seat surface 31 and the lower surface side cutting edge 64b of the insert 60 is denoted by W2, the W1 and the W2 have the following relationship W1>W2. With this construction, owing the first intersection portion 43 lying more outward than the lower surface side cutting edge 64b with the predetermined distance therebetween, chips generated are less likely to contact the lower surface side cutting edge 64b, thereby reducing fractures of the lower surface side cutting edge 64b.

The W1 means the distance between the first intersection portion 43 and the peripheral part of the lower surface 12 lying adjacent to the first intersection portion 43, in a direction orthogonal to the first intersection portion 43 when viewed from a direction substantially perpendicular to the bearing seat surface 31. The W2 means the distance between the bearing seat surface 31 and the lower surface side cutting edge 64b in a vertical direction with respect to the bearing seat surface 31. Although the first intersection portion 43 out of the first intersection portion 43 and the second intersection portion 44 of the holder 20 has been described above, the second intersection portion 44 is also preferably constructed similarly to the first intersection portion 43.

In the case of comprising a sheet member, the W1 and the W2 may be represented as follows. That is, the W1 may represent the distance between the peripheral part of the sheet member and the peripheral part of the lower surface 62 of the insert 60 lying adjacent to the sheet member. The W2 may represent the distance between an abutment surface in the sheet member against which the lower surface 62 abuts, and the lower surface side cutting edge 64b. Other constructions are similar to that described with respect to the cutting tool 1 of the foregoing embodiment.

Although in the present embodiment, the lower surface side cutting edge 64b is spaced from the bearing seat surface 31 by comprising the breaker groove 65, the present invention is not limited thereto. That is, in such a construction that the lower surface side cutting edge 64b is separated from the bearing seat surface 31 in the absence of the breaker groove 65, the construction may satisfy the above relationship between the W1 and the W2.

While the several embodiments of the present invention are described and illustrated above, it is to be understood that the present invention is not limited thereto, and applicable to those in which changes or improvements are made thereto without departing from the scope of the present invention. For example, though the foregoing embodiment describes the insert 10 having the substantially parallelogram shape when viewed from above, the shape of the insert according to the invention is not limited thereto, and it may have a polygonal shape such as a substantially triangular shape or a substantially pentagonal shape.

For attaching the insert to the holder, the clamp method in which the insert 10 is screwed into the holder 20 is described above. Alternatively, clamp-on method, lever lock method, or the like may be employed.

In the foregoing embodiment, both of the first intersection portion 43 and the second intersection portion 44 of the holder 20 lie more outward than the lower surface side cutting edge 14b of the insert 10. The distance between the first intersection portion 43 and the lower surface side cutting edge 14b of the insert 10 lying adjacent to the first intersection portion 43, and the distance between the second intersection portion 44 and the lower surface side cutting edge 14b lying adjacent to the second intersection portion 44 are same. Alternatively, either one of these distances may be longer than the other. In this case, the individual distances preferably have the following relationship.

That is, as shown in FIG. 6(a), a first intersection portion 73 and a second intersection portion 74 of a holder 70 lie more outward than the lower surface side cutting edge 14b of the insert 10.

When the distance between the second intersection portion 74 and the lower surface side cutting edge 14b of the insert 10 lying adjacent to the second intersection portion 74 is denoted by W3, and the distance between the first intersection portion 73 and the lower surface side cutting edge 14b lying adjacent to the first intersection portion 73 is denoted by W4, the W3 and the W4 have the following relationship W3>W4.

Chips generated are, in view of the discharge mechanism thereof, more likely to contact the lower surface side cutting edge 14b on a side surface 72 out of a front surface 71 and the side surface 72 of the holder 70. Therefore, when the W3 and the W4 have the relationship W3>W4, the second intersection portion 74 lying adjacent to the side surface 72, at which the chips are likely to contact, lies more outward than the lower surface side cutting edge 14b. Consequently, these chips are less likely to contact the lower surface side cutting edge 14b, thereby reducing fractures of the lower surface side cutting edge 14b.

The W3 and the W4 are defined similarly to the W1. In the case of comprising a sheet member, these W3 and the W4 may represent the distance between the peripheral part of the sheet member and the lower surface side cutting edge 14b of the insert 10 lying adjacent to the sheet member. Other constructions are similar to that described with respect to the cutting tool 1 of the foregoing embodiment.

On the other hand, in the foregoing embodiment, the distance between the first intersection portion 43 or the second intersection portion 44 and the peripheral part of the lower surface 12 of the insert 10 lying adjacent to the first intersection portion 43 or the second intersection portion 44 is constant over the entire length of the first intersection portion 43 or the second intersection portion 44. Alternatively, the above distance may reach a maximum at one end of each of the first intersection portion 43 and the second intersection portion 44. In this case, the following formation is preferable.

That is, as shown in FIG. 6(b), a distance W1 between a first intersection portion 83 or a second intersection portion 84 of a holder 80 and the peripheral part of the lower surface 12 of the insert 10 lying adjacent to the first intersection 83 or the second intersection portion 84 reaches a maximum on an intersection portion 85 between a front surface 81 and a side surface 82 of the holder 80. Further, the distance W1 is decreased toward the direction indicated by arrow D, namely, the direction away from the intersection portion 85 of the holder 80.

Chips generated are, in view of the discharge mechanism thereof, more likely to contact the lower surface side cutting edge 14b on the intersection portion 85 of the holder 80. Consequently, when the distance W1 reaches a maximum on the intersection portion 85 of the holder 80, the end of either one of the first intersection portion 83 and the second intersection portion 84, which the chips are likely to contact, lies more outward than the lower surface side cutting edge 14b. Hence, the chips are less likely to contact the lower surface side cutting edge 14b, thereby reducing fractures of the lower surface side cutting edge 14b.

As long as the distance W1 reaches a maximum on the intersection portion 85 of the holder 80, it may be unnecessary to form so that it decreases with increasing the distance from the intersection portion 85. In the case of comprising a sheet member, the distance W1 between the peripheral part of the sheet member lying adjacent to the first intersection portion 83 or the second intersection portion 84 and the peripheral part of the lower surface 12 lying adjacent to the individual peripheral part of the sheet member may reach a maximum on the intersection portion 85. Other constructions are similar to that described with respect to the cutting tool 1 of the foregoing embodiment.

Although in the foregoing embodiment, both of the first intersection portion 43 and the second intersection portion 44 of the holder 20 lie more outward than the lower surface side cutting edge 14b of the insert 10, only one of the first intersection portion 43 and the second intersection portion 44, at which chips are more likely to contact the lower surface side cutting edge 14b depending on cutting conditions or the like, may lie more outward than the lower surface side cutting edge 14b.

That is, as shown in FIG. 7(a), only the first intersection portion 43 may lie more outward than the lower surface side cutting edge 14b. Alternatively, as shown in FIG. 7(b), only the second intersection portion 44 may lie more outward than the lower surface side cutting edge 14b. Other constructions are similar to that described with respect to the cutting tool 1 of the foregoing embodiment.

As shown in FIGS. 8(a) to 8(c), only one of the first intersection portion 43 and the second intersection portion 44, at which chips are more likely to contact the lower surface side cutting edge depending on the arrangement of the breaker groove, may lie more outward than the lower surface side cutting edge of the insert.

That is, as shown in FIGS. 8(a) and 8(b), in inserts 90 and 95, breaker grooves 92a and 97a on upper surfaces 91 and 96 are disposed along a side surface 42 of a holder 20, respectively. In these inserts 90 and 95, breaker grooves 92b and 97b (illustrated by dotted lines) on lower surfaces 93 and 98, respectively, are arranged along a front surface 41 of the holder 20.

In these embodiments, only the first intersection portion 43 preferably lie more outward than lower surface side cutting edges 94 and 99 in the inserts 90 and 95, respectively. This is suitable for reducing fractures of the lower surface side cutting edges 94 and 99.

As shown in FIG. 8(c), in an insert 100, a breaker groove 102 on an upper surface 101 has a symmetrical shape with respect to a bisector L of a corner portion 103. In the insert 100, the upper and lower surfaces form congruent figures (the lower surface side is not shown). In this embodiment, in view of the chip discharge mechanism, only the second intersection portion 44 preferably lies more outward than a lower surface side cutting edge 104 of the insert 100, as described above. This is suitable for reducing fractures in the lower surface side cutting edge 104.

In the foregoing embodiment, the front surface 41 of the holder 20 is formed in an inclined surface shape extending from the first intersection portion 43 lying more outward than the lower surface side cutting edge 14b with a predetermined distance therebetween, toward the lower surface 45 of the holder 20 not lying outward. Alternatively, the front surface of the holder may be formed as shown in FIGS. 9(a) to 9(c).

Figure 9:
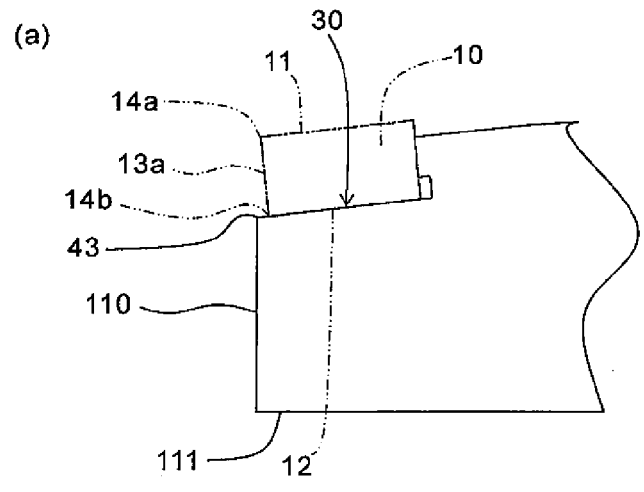
FIGS. 9(a) to 9(c) are partially schematic side views, each showing the vicinity of a front part of a holder of a cutting tool according to another different embodiment of the invention.
Figure 9:
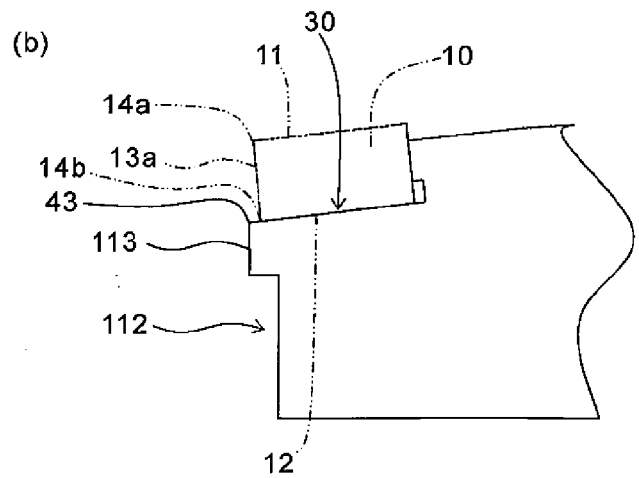
Figure 9:
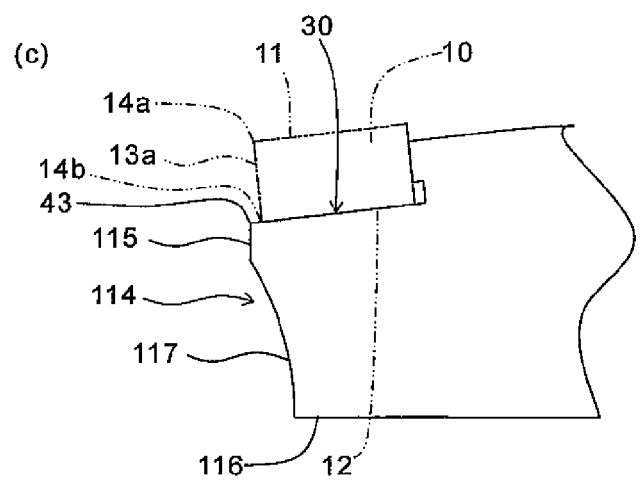

That is, as shown in FIG. 9(a), a first intersection portion 43, as well as a front surface 110 of the holder lying adjacent to the first intersection portion 43, and a part of a lower surface 111 of the holder may lie more outward than the lower surface side cutting edge 14b of the insert 10. Consequently, the front surface 110 is formed by a substantially vertical surface, and the holder lies still more outward than the lower surface side cutting edge 14b, thereby improving the toughness of the holder.

As shown in FIG. 9(b), a projected portion 113 may be formed at an upper part of a front surface 112 of the holder. As shown in FIG. 9(c), a projected part 115 may be formed at an upper part of a front surface 114 of the holder, and the region between the projected portion 115 and a lower surface 116 of the holder may be formed by a curved surface 117. Although the front surface 41 of the holder 20 is described above, similarly to the front surface 41, the side surface 42 of the holder 20 may be formed by the substantially vertical surface, the projected portion, the curved surface and the like. Other constructions are similar to that described with respect to the cutting tool 1 of the foregoing embodiment.

Although the foregoing embodiment describes the case where the bearing seat surface 31 of the insert pocket 30 is inclined so as to approach the lower surface 45 of the holder 20 toward the front surface 41 of the holder 20, the bearing seat surface may be inclined so as to approach the lower surface of the holder toward at least one of the front surface and the one side surface of the holder. This achieves the effect that the insert can be attached to the insert pocket in such an inclined position as to approach the lower surface of the holder. Depending on purpose, the bearing seat surface may be formed substantially parallel to the lower surface of the holder.

Figure 10:
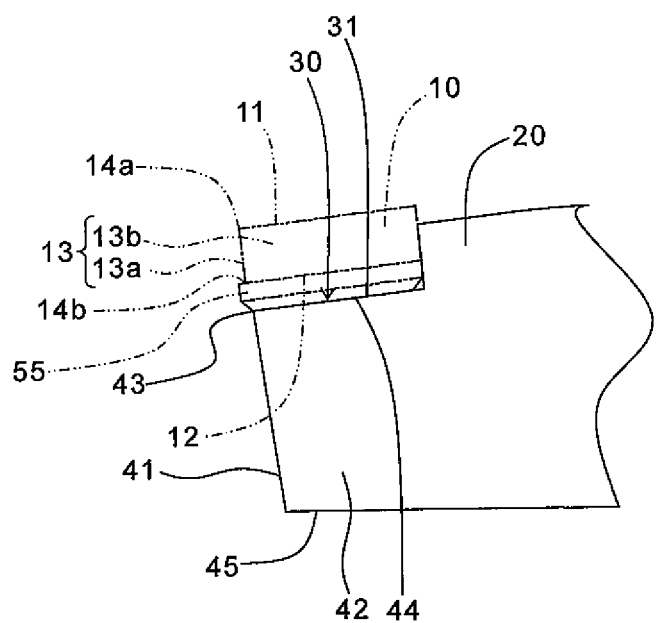
FIG. 10 is a partially schematic side view showing the vicinity of a front part of a holder of a cutting tool according to still another embodiment of the invention.

When the cutting tool comprises a sheet member, the cutting tool may have, for example, the construction as shown in FIG. 10. That is, only the peripheral part of the sheet member 55 lying adjacent to the front surface 41 and the side surface 42 of the holder 20 may lie more outward than the lower surface side cutting edge 14b of the insert 10. This ensures a large clearance between the front part 22 of the holder 20 (refer to FIG. 2) and a work material. Other constructions are similar to that described with respect to the cutting tool 1 of the foregoing embodiment.

Although in the foregoing embodiment, external turning, specifically traversing has been described as a cutting method, the cutting tools according to the present invention are also suitably applicable to other cuttings such as internal turning and the like, besides the external turning.

The present invention is not limited to the individual cutting tools according to the foregoing embodiments, and may be a cutting tool according to another embodiment as a combination of a certain embodiment and other embodiment.

The invention claimed is:

1. A cutting tool comprising:
a cutting insert comprising an upper surface, a lower surface, a side surface connected to the upper surface and the lower surface, and an upper surface side cutting edge and a lower surface side cutting edge disposed on an intersection portion between the upper surface and the side surface and on an intersection portion between the lower surface and the side surface, respectively; and
a holder comprising at a front part thereof an insert pocket to which the cutting insert is attached, wherein
the insert pocket comprises a bearing seat surface against which the lower surface of the cutting insert abuts, and is opened into a front surface and a side surface of the holder, respectively, and
at least one of a first intersection portion lying at an intersection portion between the bearing seat surface of the insert pocket and the front surface of the holder, and a second intersection portion lying at an intersection portion between the bearing seat surface of the insert pocket and the side surface of the holder, lies more outward than the lower surface side cutting edge of the cutting insert.

2. The cutting tool according to claim 1 wherein the second intersection portion, the side surface of the holder and a part of a lower surface of the holder lie more outward than the lower surface side cutting edge of the cutting insert.

3. The cutting tool according to claim 1 wherein the first intersection portion, the front surface of the holder and a part of a lower surface of the holder lie more outward than the lower surface side cutting edge of the cutting insert.

4. A cutting tool comprising:
a cutting insert comprising an upper surface, a lower surface, a first side surface and a second side surface connected to the upper surface and the lower surface and adjacent to each other, a corner portion between the first and the second side surfaces, and an upper surface side cutting edge and a lower surface side cutting edge disposed on positions corresponding to the corner portion in an intersection portion between the upper surface and the first and the second side surfaces, and in an intersection portion between the lower surface and the first and the second side surfaces, respectively; and
a holder comprising at a front part thereof an insert pocket to which the cutting insert is attached, wherein
the insert pocket comprises a bearing seat surface against which the lower surface of the cutting insert abuts, and is opened into a front surface and a side surface of the holder, respectively, and
at least one of a first intersection portion lying at an intersection portion between the bearing seat surface of the insert pocket and the front surface of the holder, and a second intersection portion lying at an intersection portion between the bearing seat surface of the insert pocket and the side surface of the holder, lies more outward than the lower surface side cutting edge of the cutting insert.

5. The cutting tool according to claim 1 wherein the bearing seat surface of the insert pocket is inclined so as to approach a lower surface of the holder toward at least one of the front surface and the side surface of the holder.

6. The cutting tool according to claim 1 further comprising a sheet member disposed between the cutting insert and the insert pocket, wherein a peripheral part of the sheet member lying adjacent to at least one of the first intersection portion and the second intersection portion of the holder lies more outward than the lower surface side cutting edge of the cutting insert.

7. The cutting tool according to claim 1 wherein, when at least one of the distance between the first intersection portion of the holder and an peripheral part of the lower surface of the cutting insert and the distance between the second intersection portion of the holder and the peripheral part of the lower surface of the cutting insert is denoted by $W1$, and the distance between the bearing seat surface and the lower surface side cutting edge of the cutting insert is denoted by $W2$, the $W1$ and the $W2$ have a relationship $W1 > W2$.

8. The cutting tool according to claim 1 wherein,
both of the first intersection portion and the second intersection portion of the holder lie more outward than the lower surface side cutting edge of the cutting insert, and
when the distance between the second intersection portion and the lower surface side cutting edge of the cutting insert lying adjacent to the second intersection portion is denoted by $W3$, and the distance between the first intersection portion and the lower surface side cutting edge lying adjacent to the first intersection portion is denoted by $W4$, the $W3$ and the $W4$ have a relationship $W3 > W4$.

9. The cutting tool according to claim 1 wherein the distance $W1$ comprising at least one of the distance between the first intersection portion of the holder and an peripheral part of the lower surface of the cutting insert and the distance between the second intersection portion of the holder and the peripheral part of the lower surface of the cutting insert, reaches a maximum on the intersection portion between the front surface and the side surface of the holder.

10. The cutting tool according to claim 9 wherein the distance $W1$ decreases with increasing the distance from the intersection portion between the front surface and the side surface of the holder.

11. The cutting tool according to claim 1 wherein breaker grooves are disposed more inside of the cutting insert than the upper surface side cutting edge and the lower surface side cutting edge on the upper surface and the lower surface of the cutting insert, respectively.

12. A method of cutting a work material using a cutting tool according to claim 1, comprising:
the approach step of relatively bringing the cutting tool near the work material;
the cutting step of cutting a surface of the work material by rotating the work material and bringing the upper surface side cutting edge into contact with the surface of the work material; and
the separation step of relatively separating the work material and the cutting tool.

* * * * *